M. A. Hackley,
Cheese Press.
N° 9,625.   Patented Mar. 22, 1853.
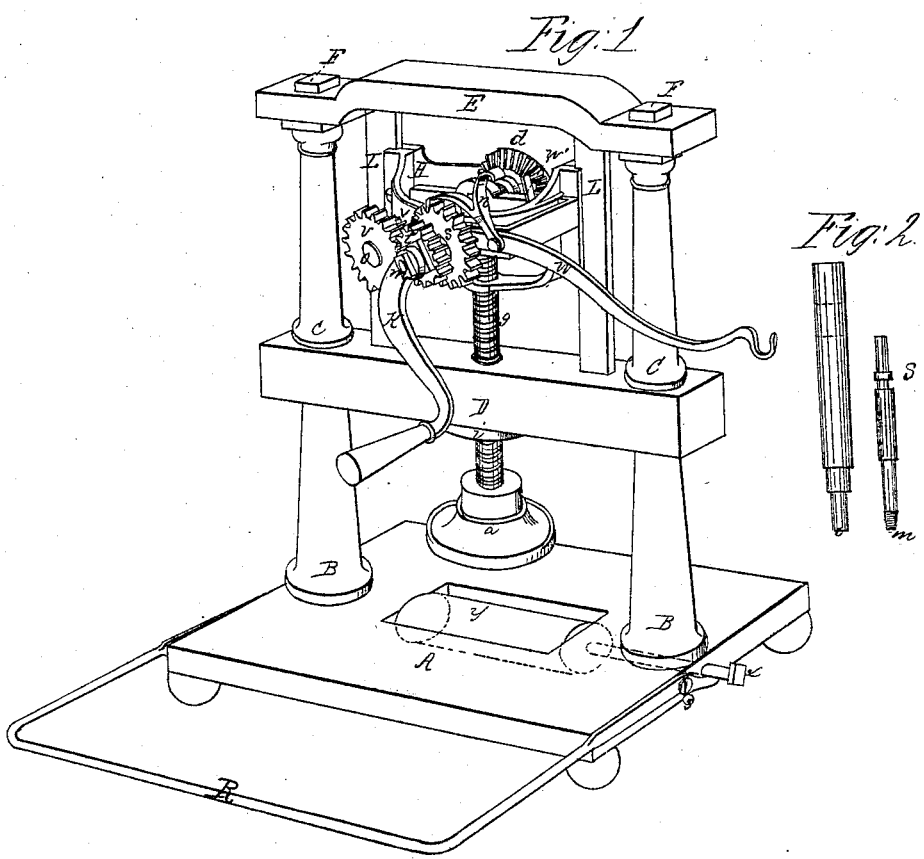

UNITED STATES PATENT OFFICE.

M. A. HACKLEY, OF BELLEVILLE, NEW YORK.

CHEESE-PRESS.

Specification of Letters Patent No. 9,625, dated March 22, 1853.

*To all whom it may concern:*

Be it known that I, MILLS A. HACKLEY, of Belleville, in the county of Jefferson and State of New York, have invented a new and useful Machine for Pressing Cheese; and I do hereby declare that the following is a full and exact description thereof, reference being had to the accompanying drawings and to the letters of reference marked thereon, making a part of this specification, in which—

Figure 1 is a perspective view and Fig. 2 a section.

The nature of my invention consists in placing an adequate power, in a convenient form, whereby a person of ordinary strength and even the weaker members of the dairyman's family may perform the varied labors of pressing cheese, without aid, and with comparative ease, and also in applying the power in a manner, which gives strength and durability to the machine, allows it to occupy but little room, and will invariably press the cheese true.

To enable others skilled in the science of mechanics or the art of cheese making, to make, or use my invention, I will proceed to describe its construction and operation.

The bed piece A, I usually construct of the inch plank, thirty-six inches in length, and twenty inches in width, upon this bed piece I place the pillars B, B, which may be round or square or any other shape desired and from (18) eighteen to (20) twenty inches in length: the beam D I make of the same length as the bed piece, and (4) four inches high, by (6) six inches wide; upon this beam I place the pillars C, C, of the same form as those below, and (14) fourteen inches in length: the top cross piece E the same length as the beam, made of three inch plank the whole held firmly together by the iron bolts F, F, which pass through the entire length: the screw, $g$ to which is attached the bevel gear (which connects with the gear $d$) passes through the nut $i$ and enters the follower $a$, to which it is attached by a common set screw. The gear $d$ which matches with the gear on the head of the screw is attached to a shaft $o$ with bearings in each side of the sliding frame H which slides upon the guides L L. The gear $s$ upon which the dog $n$ acts, and the smaller one $t$ are attached to the shaft $m$ Fig. 1 upon which the crank $k$ and the leaves $w$ act. This shaft may have bearings in each side of the sliding frame, the same as the other shafts.

When intended only for light work the crank and lever may be attached to the shaft $o$ upon which is the driving wheel.

$v$ represents a gear receiving its motion from the gear, $t$, behind V is a small gear $v$ (as shown in Fig. 1) which connects with $s$ when $v$ and $t$ are out of gear; the spring $w'$ Fig. 1 is to keep the shaft $m$ in its proper place by means of the slots at S Fig. 2 to be used for the purpose of giving either motion or power to the screw.

The small frame R is to be used as a turning table on which to turn the cheese, and acts in connection with the roller Y so as to raise or depress it as may be required. This turning table (R) is constructed of iron and bent in a square form as represented in the drawing (Fig. 1) and securely attached to the bed piece A by means of screws Q upon which it works. From the point where the screws Q pass through the turning table, the extremities of the turning table are sufficiently curved so as to pass beneath the shaft X upon which the roller Y works which shaft extends through the bed piece A and projects on both sides of said bed piece sufficient to receive the bearing of the turning table. Thus the turning table becomes a powerful lever by means of which the roller is raised and the withdrawing of the cheese from the press made easy and its turning speedily and conveniently accomplished.

What I claim as my invention and desire to secure by Letters Patent is—

The turning table—R, or its equivalent, in combination with the roller in such manner that whenever the table is adjusted for turning the cheese, there will be a corresponding adjustment of the roller, for facilitating the process of turning the same.

M. A. HACKLEY.

Witnesses:
JOHN L. SMITH,
JOHN DAVIS.